Nov. 27, 1923.
H. L. FURR
1,475,811
AUTOMOBILE SIGNAL
Filed Aug. 22, 1922    2 Sheets-Sheet 1
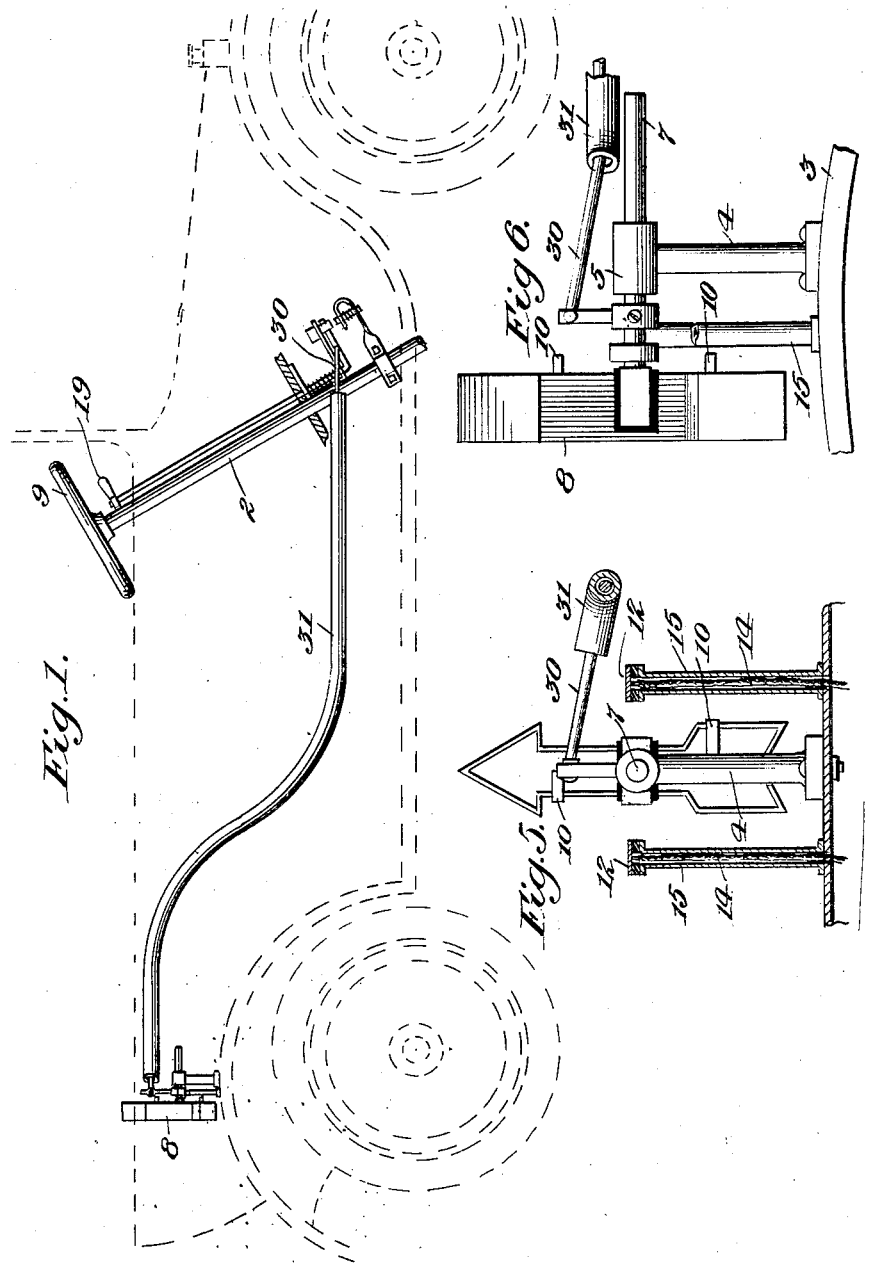
Inventor:
Harry L. Furr,
by E. A. Mason
Att'y.

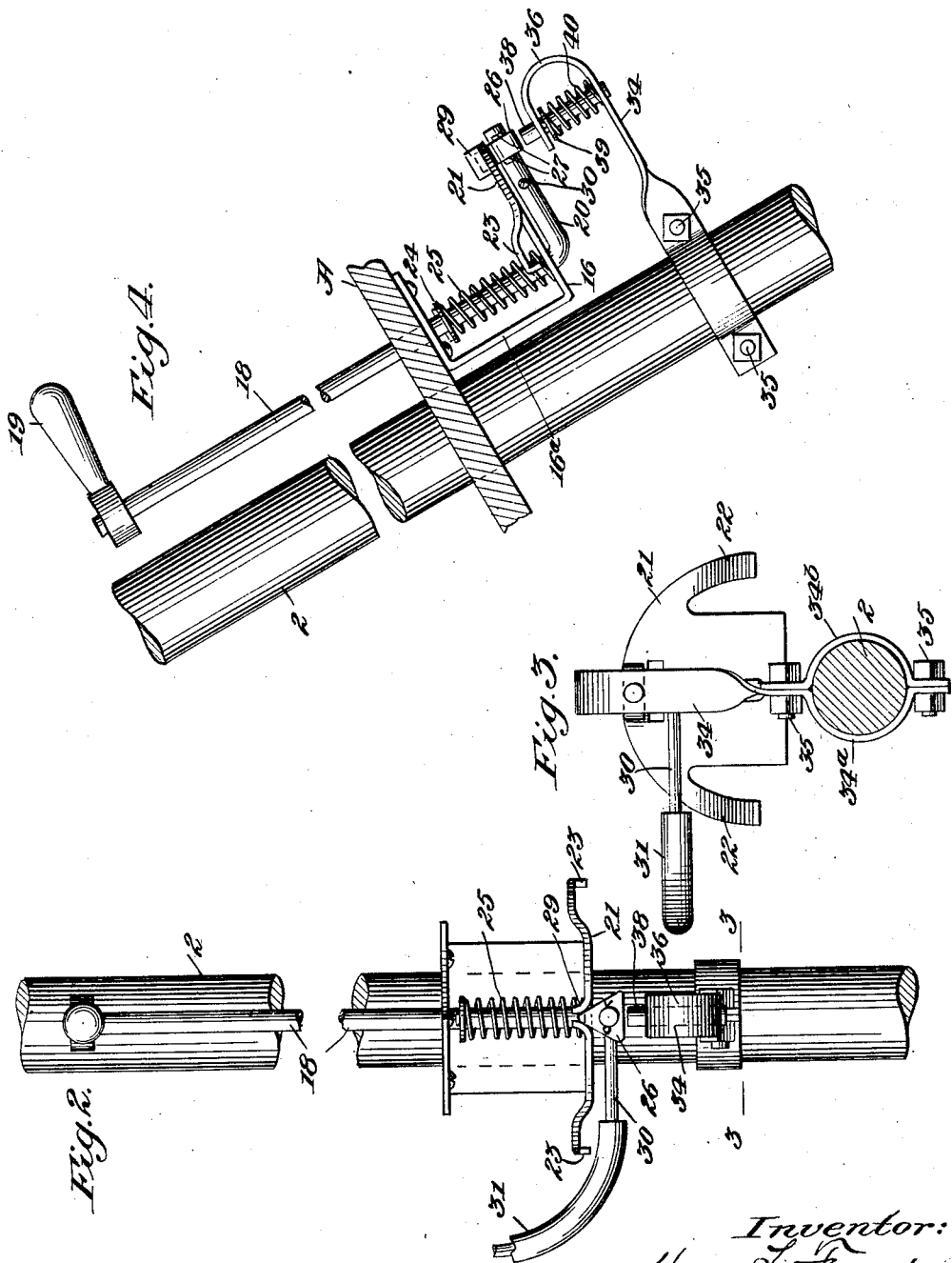

Patented Nov. 27, 1923.

1,475,811

UNITED STATES PATENT OFFICE.

HARRY L. FURR, OF HARRISONBURG, VIRGINIA.

AUTOMOBILE SIGNAL.

Application filed August 22, 1922. Serial No. 583,395.

*To all whom it may concern:*

Be it known that I, HARRY L. FURR, a citizen of the United States of America, residing at Harrisonburg, in the county of Rockingham and State of Virginia, have invented certain new and useful Improvements in Automobile Signals, of which the following is a full, clear, and exact description.

This invention relates to signal devices for indicating the direction in which a motor vehicle will turn, in advance of such turning movement.

An important feature of the invention is comprised in means whereby after setting the signal device indicating that the vehicle is about to turn to the right, or to the left, such device will be restored to neutral position automatically when the vehicle steering mechanism is moved to change the direction of the vehicle.

Other important features of the invention, and certain details of construction and combinations of parts will be better understood from the following description in connection with the accompanying drawings, and will be more particularly pointed out in the appended claims.

In the drawings,

Fig. 1 represents, in side elevation, the invention applied to a motor vehicle, the latter being indicated by broken lines;

Fig. 2 is an enlarged detail view in elevation;

Fig. 3 is a sectional plan view on the line 3—3, Fig. 2;

Fig. 4 is a side elevation taken at right angles to Fig. 2;

Fig. 5 is an elevation of the direction-indicating device, and

Fig. 6 is a view at right angles to Fig. 5.

As shown in the drawings, the usual steering post of the motor vehicle passes through the platform A, the steering post being connected with the usual instrumentalities for turning the front wheels to the right or to the left, according to the direction in which the vehicle is to be steered.

At a suitable point on the vehicle, as upon one of the rear wheel fenders 3 is a supporting post 4, having at its upper end a sleeve 5, provided with a longitudinal opening for guiding the stem or rod 7. This stem or rod carries the direction indicator 8 which is herein shown as having the shape of an arrow. The mechanism hereinafter described has for its object to turn this direction indicator, about 90° to the right, or to the left, just prior to turning the steering wheel 9 of the vehicle for causing the latter to likewise turn to the right, or to the left. By moving the indicator 8 to the left, the arrow head thereon will give warning to the drivers of following vehicles that the motor vehicle on which the indicator is mounted is about to be steered to the left, and upon turning such indicator to the right will warn drivers of the following vehicles that a right hand turn is about to be made. The indicator 8, is preferably made of metal or other suitable material, and is of hollow form, and its two sides may be covered with a transparent substance, such as glass, part of which may, if desired, be colored red. Interiorly, the indicator may be provided with an electric light globe having its wires connected with suitable contact devices 10. In the path of movement of the devices 10 are suitable terminals 12, connected with wires 14, in protecting tubes 15 which may be mounted as shown on the fender 3. The wires 14 receive current from the motor vehicle battery, or other suitable source, and when the indicating device 8 is turned to the right, or to the left to show the direction in which the vehicle is turned, the contact devices 10 will engage the terminals 12, completing a circuit and causing the lamp within the indicator 8 to glow. When the indicator is turned to vertical or neutral position, the circuit will be broken and the lamp will go out.

To the underside of the platform A is secured a bracket 16, composed of upper and lower parallel members and a right-angularly disposed connecting member 16ª, the parallel members of the bracket being provided with two registering openings through which passes a rod 18 having at its upper end a handle 19 and at its lower end a right angularly turned portion 20. The rod 18 is arranged parallel with and closely adjacent to the steering post, and the handle 19 is preferably located immediately below the steering wheel 9.

The lower member of the bracket 16 is formed as a plate 21, whose outer portion is curved as a semi-circle, and provided with terminal portions 22, having down turned ends 23, forming stops.

The rod 18 is provided with a washer 24, which forms an abutment for one end of a spiral spring 25 which surrounds that portion of the rod within the bracket 16. The lower end of the spring bears against the plate 21, thus confining said spring under some tension between the washer 24 and the plate 21. The outer end portion 20 of the rod 18 passes through a hole in a triangular stop 26, which is confined against longitudinal movement on the rod by suitable confining devices 27, such as cotter pins which pass through the rod.

The spring 25 draws the end 20 of the rod 18 upwardly, and maintains a point of the angular stop 26 in a recess 29, which is formed by bending inwardly the two separated ends of the metal at the central portion of the forward edge of the plate 21.

Suitably connected to the bent portion 20 of the rod 18 is a wire 30, which is conducted through a tube 31 along the vehicle to a point opposite a post 32, which extends upward rigidly from the rod 7 which supports the indicator 8. With the above construction and arrangement of parts, when the handle 19 is turned about 90°, as to the left, such movement will cause a pull upon the wire 30, which likewise will pull the indicator device to the left, showing that the vehicle is about to turn in that direction. In this movement the stop 26 travels from its seat 29, around the face of the plate 21 until one of the corners of the stop will engage with a limiting device 23, and arrest the movement of the wire 30. On the other hand, if the handle 19 is turned to the right, the wire 30 will be moved in a reversed direction through the tube 31, and will move the indicator 8 to the right, pointing in the direction in which the vehicle is about to be turned.

Below the platform A a bracket 34 having two semi-circular clamp members 34ª, 34ᵇ, is clamped by bolts 35 to the steering post. The bracket has a curved portion 36 and extending through aligned openings therein is a pin 38, having a washer 39, and surrounded by spiral spring 40, which is confined between the bracket and the washer, and maintains the upper end of the pin 38 projected above the recurved portion of the bracket. The upwardly projecting end of the pin is located in close proximity with the triangular stop device 26 when the parts are in neutral position, as shown in Fig. 2. When the handle 19 of the signal operating device is turned in either direction, the stop device 26 will be carried out of the opening 29, and will slide along the face of the curved outer portion of the plate 21, turning in such movement until its flat side slides along the face of the plate, such movement continuing until the leading point of the stop engages an arresting device 23. Immediately after the signal is operated, the steering post of the vehicle will be turned, causing the vehicle to turn to the left, for example. By the same movement, the pin 38 is carried around by the steering post in the same direction in which the stop 26 moved, and when said pin encounters said stop, it will be pressed outwardly against the stress of the spring 40, and will snap over the stop 26, the latter being held rigidly against displacement at this time by the arresting device 23.

When the steering wheel is turned in a reverse direction, for the purpose of causing the vehicle to travel straight ahead, such movement of the steering wheel will carry the pin 38 back to neutral, or central position, as shown in Fig. 2, and in such movement the pin will carry the stop device 26 back to its original position. In this operation the projecting pin 38 acts against one of the flat faces of the stop device, and as the pin meets with little resistance it easily restores said device to neutral position, moving the wire 30 at the same time in a direction for likewise restoring the indicator 8 to neutral position, as shown in Fig. 5, thus showing that the car is traveling straight ahead.

It is to be understood that when the indicator 8 is moved in either direction to indicate a turn to the left, or to the right, the electrical circuit will be completed through the lamp in the indicator, whereby the position of the latter may be determined at sight.

Having thus described my invention, what I claim as new and desire to secure by Letters Patent is:

1. In a device of the class described, the combination of an indicator for indicating the direction in which a vehicle will turn, a lever having connection with said device and arranged to effect said movements, a rotary stop device carried by said lever, a track along which said device travels having limiting means for said stop device, a steering post, and a device carried by said steering post and arranged for movement freely past said stop device when the post is turned in one direction, and to engage said device for restoring the indicator to neutral position when said post is moved in the reverse direction.

2. In a device of the class described, having in combination, an indicator arranged to show the direction in which a vehicle is about to be turned, means for manually setting the indicator, comprising a rod rotatably carried in a bracket below the platform and having a stop device which travels along a curved path, and connections between said rod and said indicator, a spring pressed pin carried by the steering post of the vehicle and arranged when said post is moved in one direction to pass freely over said stop device, and when it is moved in the opposite direction to engage said device and restore it and said indicator to neutral position.

3. In a device of the class described, the combination of an indicator for indicating the direction of movement of a vehicle, manual means for setting said indicator comprising a rotatable rod having a handle thereon and located in proximity to the steering post, the end portion of said rod being provided with a freely rotatable triangular stop device, connections between said rod and said indicator, a curved track over which said stop device travels, said track provided with a central seat to hold said device in central position, a curved track extending in opposite directions from said seat, said track terminating in arresting means, and a spring pressed pin carried by the steering post and arranged for movement with said post, and to yieldingly pass over said stop device when moved in one direction after the stop device has been set, and to engage said device and restore it to neutral position when the steering post is turned for causing the vehicle to move straight ahead.

In testimony whereof I have hereunto set my hand this 21 day of August A. D. 1922.

HARRY L. FURR.